United States Patent [19]

Wu

[11] Patent Number: 5,404,428

[45] Date of Patent: Apr. 4, 1995

[54] METHOD AND SYSTEM FOR UPDATING DERIVED ITEMS IN A VIEW MODEL WHICH INCLUDES MULTIPLE COORDINATE SYSTEMS

[75] Inventor: Kevin Wu, San Jose, Calif.

[73] Assignee: Sun Microsystems, Inc., Mountain View, Calif.

[21] Appl. No.: 163,987

[22] Filed: Dec. 7, 1993

[51] Int. Cl.⁶ ............................................. G06F 15/62
[52] U.S. Cl. ..................................... 395/133; 395/120; 395/140
[58] Field of Search ........................ 395/120, 133–139, 395/155, 161, 140–143, 127

[56] References Cited

U.S. PATENT DOCUMENTS 5,251,290 10/1993 Pabon .................................. 395/120

Primary Examiner—Almis Jankus
Attorney, Agent, or Firm—Blakely Sokoloff Taylor & Zafman

[57] ABSTRACT

A computer graphics interface between an application program and device pipeline. The computer system implements a view model including a plurality of coordinate systems. An acyclic graph is stored, wherein the acyclic graph representing dependencies between various items in each of the plurality of coordinate systems. Upon a creation of an item in a first coordinate system of the plurality of coordinate systems, an object is associated with the item an object which associates all derived items from the item in others of the plurality of coordinate systems, wherein the object includes a first flag for indicating whether the item current item is valid within the first coordinate system. The object further includes a second flag for indicating that at least one of the derived items is not valid in its respective coordinate system. Upon requests for the item by the application program, it is determined whether the item is valid, and if not, then the acyclic graph is descended to determine when one of the derived items is valid. When one valid item is found, the item is calculated and it is indicated that the one item is valid. Then, the acyclic graph is ascended, calculating each derived item, and indicating that each derived item is valid until reaching the requested item. Then, the requested item is calculated, a flag is set indicating that it is valid and the requested item is presented to the application program. The storage of the object further allows entry of data from multiple coordinate systems, and provides a fast test to indicate that derived items are invalid.

20 Claims, 8 Drawing Sheets

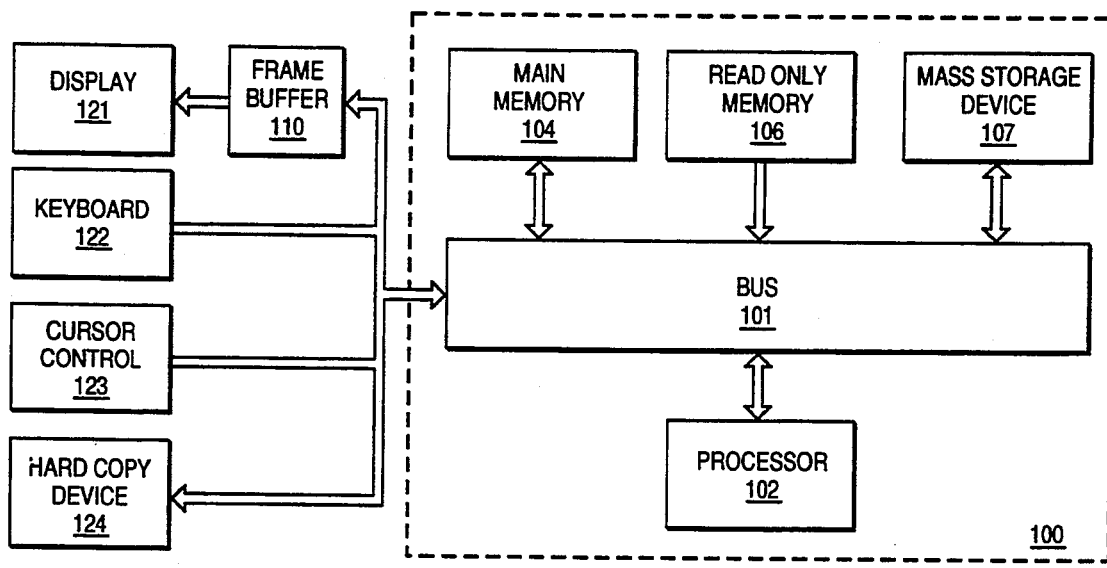
FIG_1
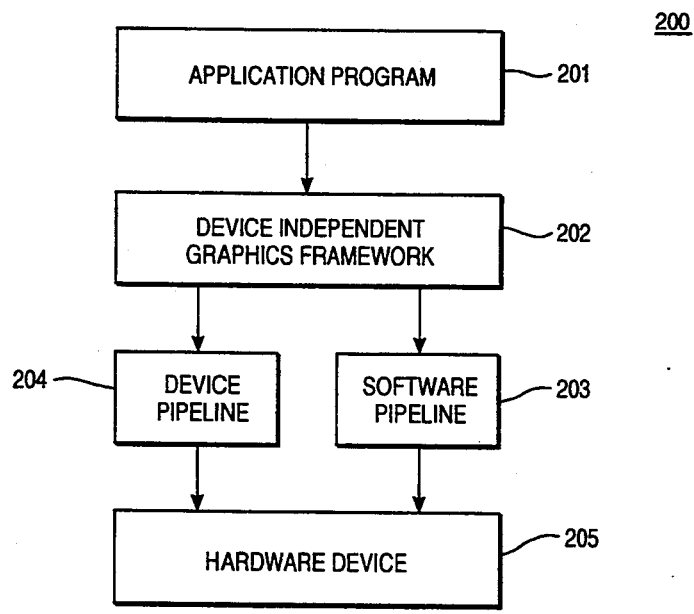
FIG_2

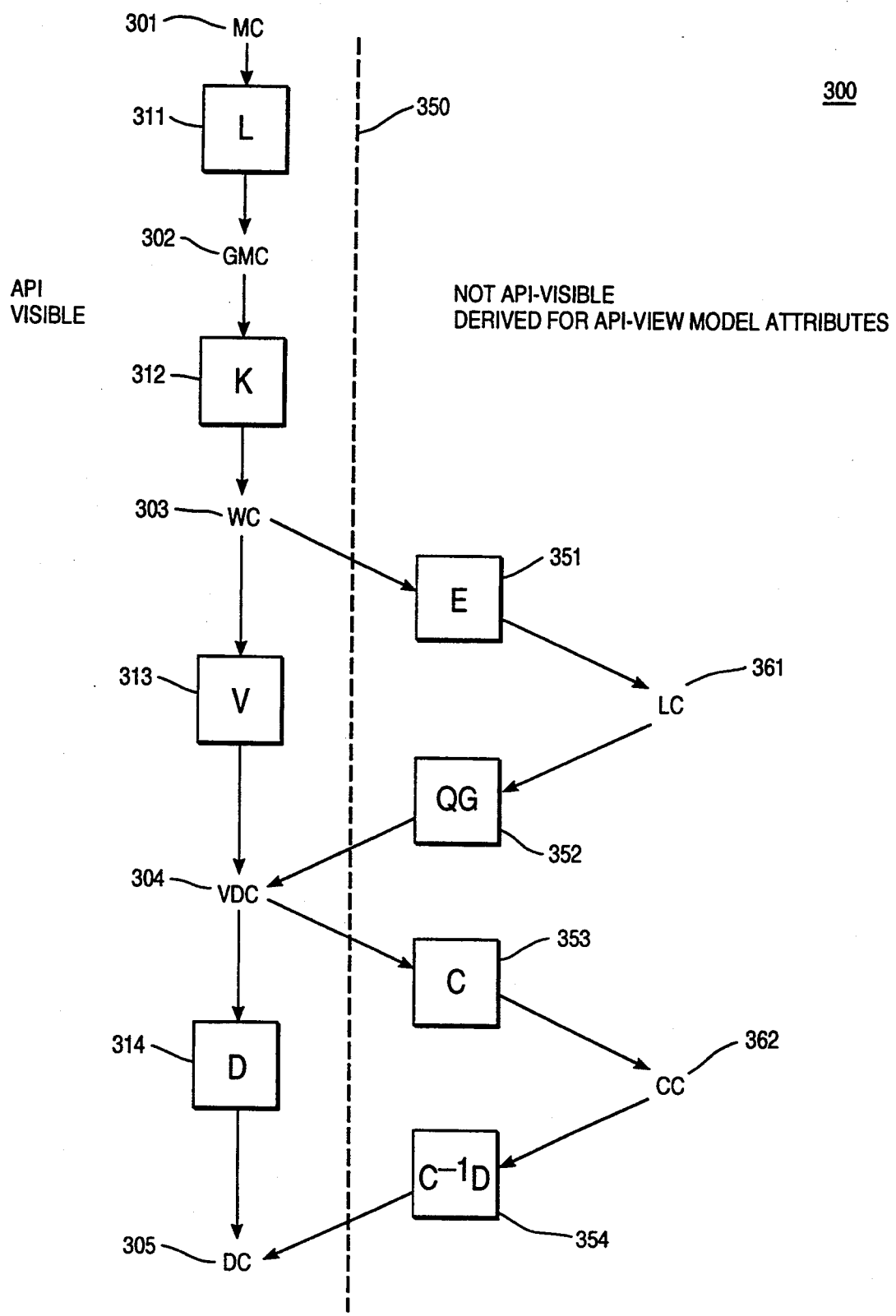
FIG_3

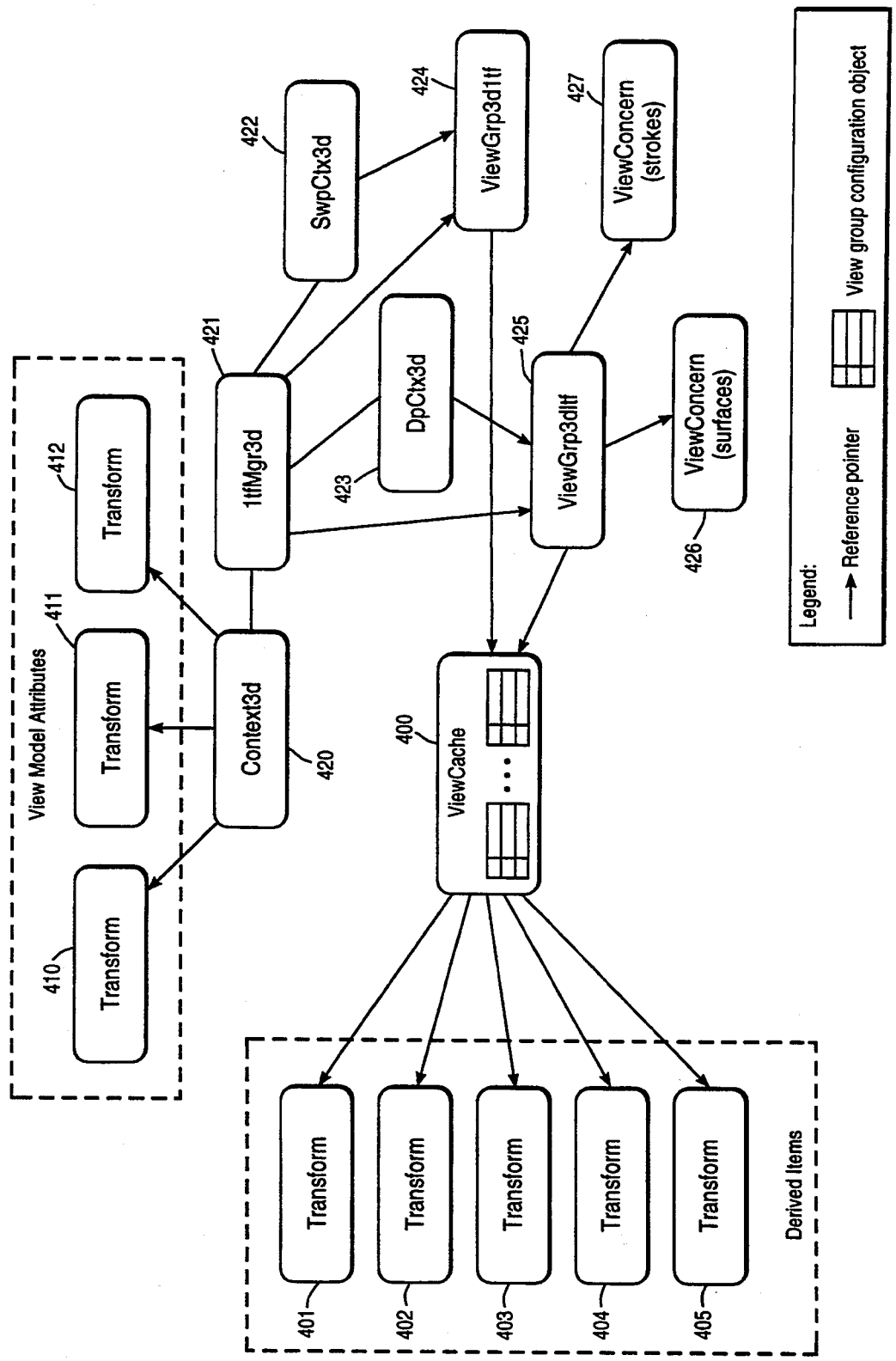
FIG_4

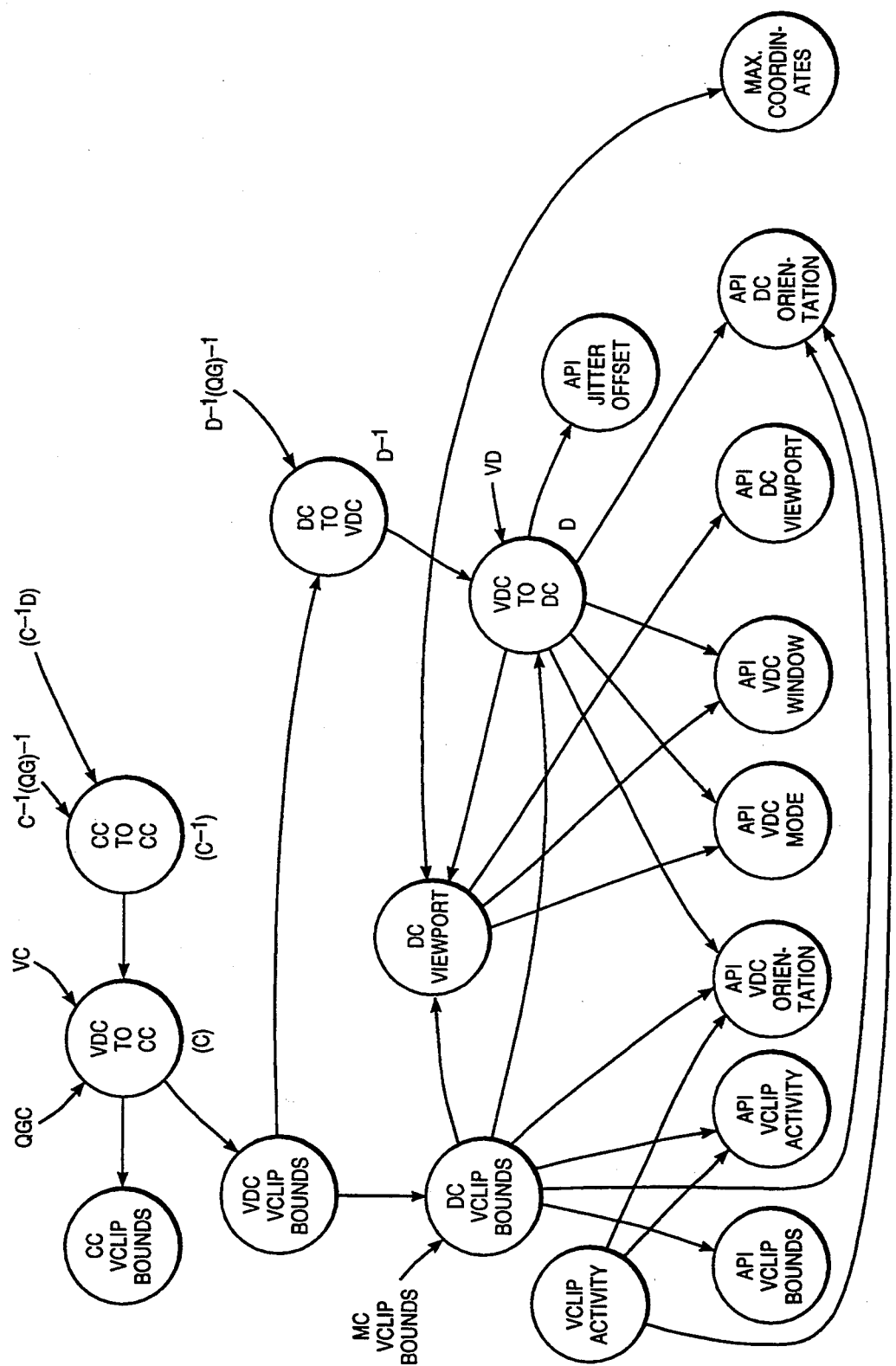

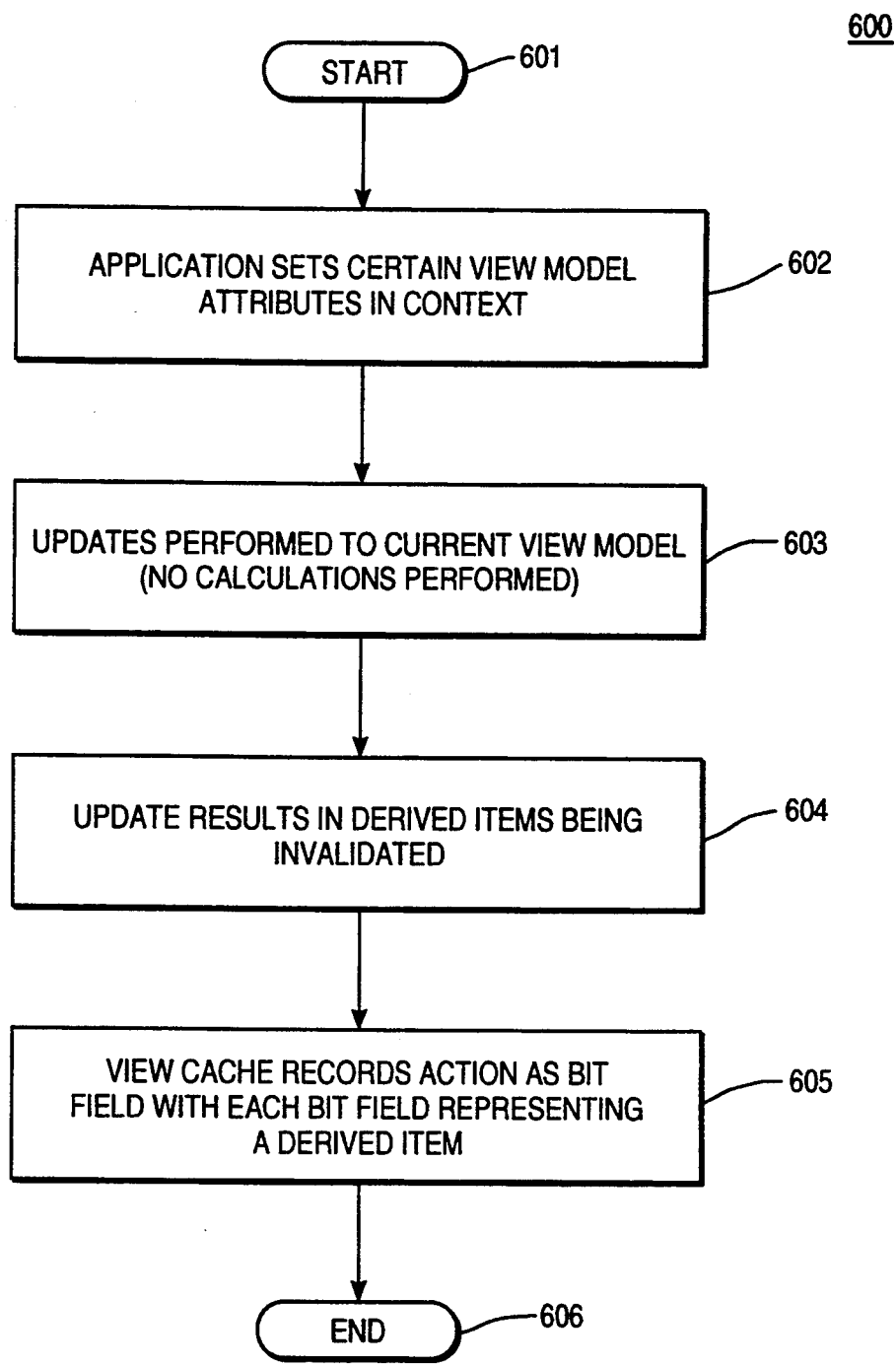
FIG_6

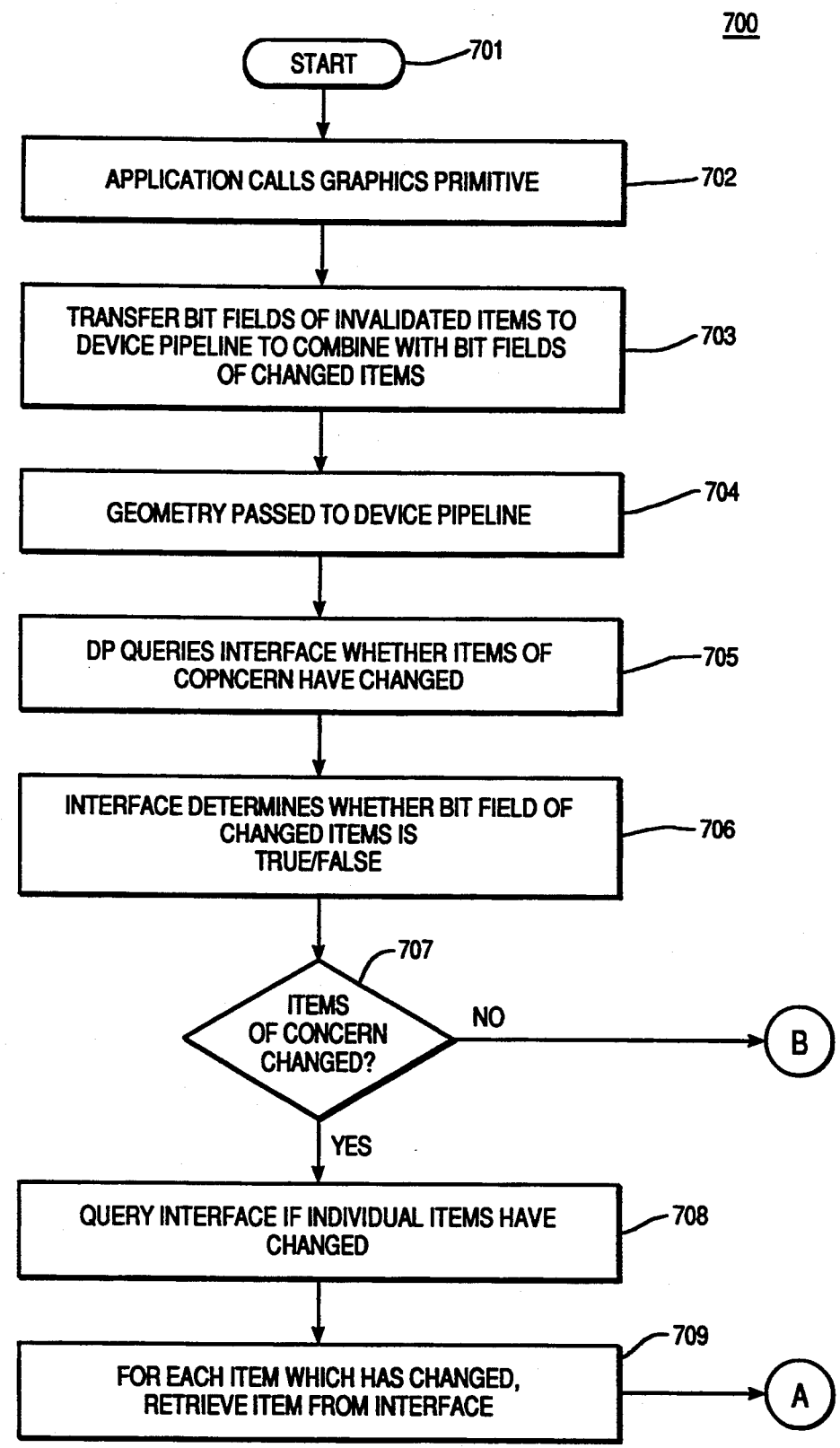
FIG_7A

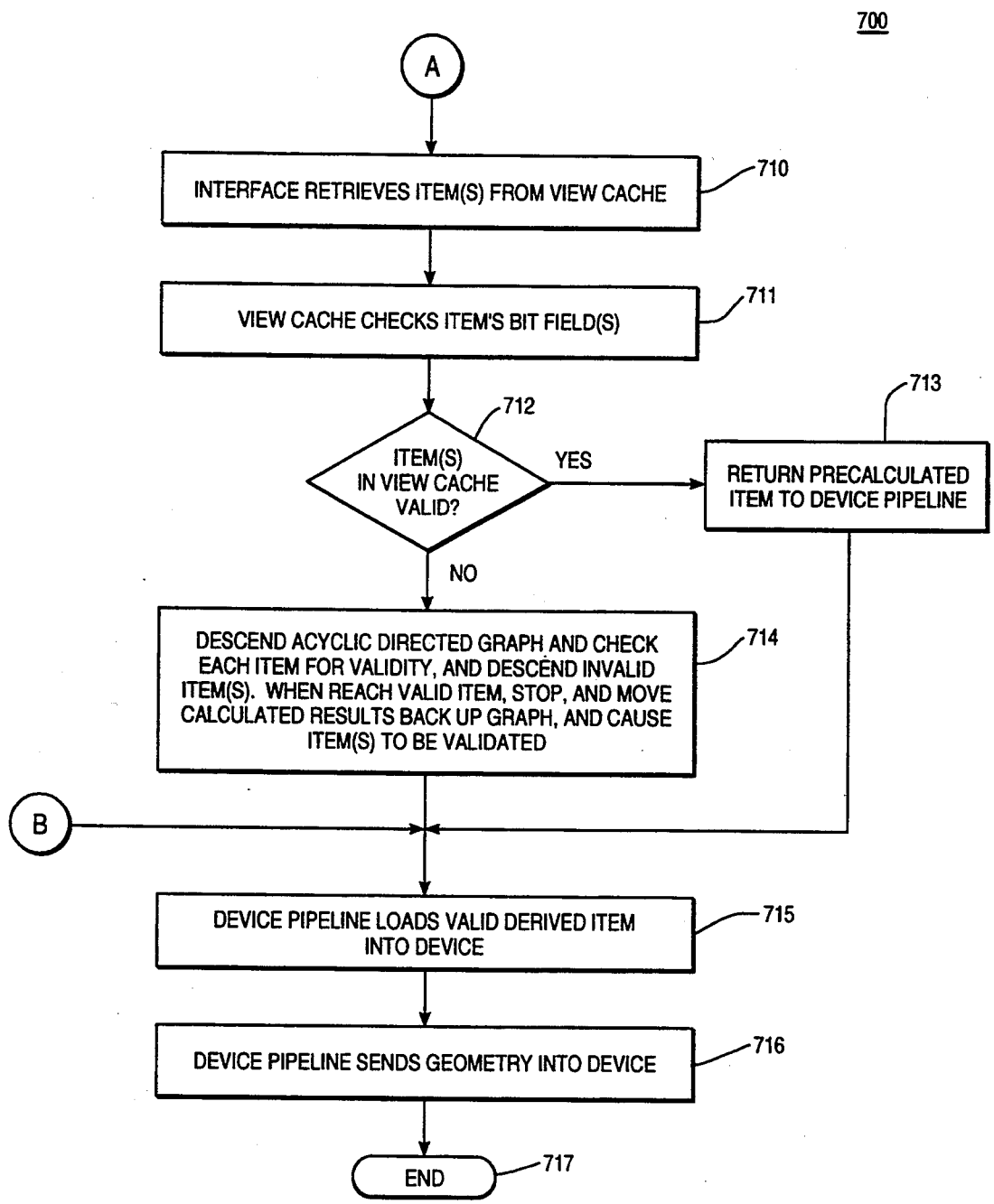

METHOD AND SYSTEM FOR UPDATING DERIVED ITEMS IN A VIEW MODEL WHICH INCLUDES MULTIPLE COORDINATE SYSTEMS

BACKGROUND OF THE INVENTION

1. Field of the Invention

The present invention relates to computer graphics systems. More specifically, this invention is a facility for perforating the geometric processing of a view model, which is configured by an application program in a computer graphics system.

2. Background Information

In computer graphics systems, a view model defines operations to be performed on geometry to be rendered. The view model has a number of coordinate systems where application programs specify operations. For example, in some prior art systems, a three-dimensional view model typically defines four coordinate systems: Model Coordinates (MC), Global Model Coordinates (GMC), World Coordinates (WC), Virtual Device Coordinates (VDC), and Device Coordinates (DC). Each coordinate system is a convenient place to specify operations. For example, the application specifies geometry in MC, lights in WC, view clip planes in VDC, and a pick aperture in DC. A sequence of matrices transform geometry from coordinate system to coordinate system where operations such as lighting, view clipping, and picking are performed. The MC-to-WC mapping is called the model matrix and the WC-to-VDC mapping is called the view matrix. The model matrix, view matrix, lights, and view clip planes are all context attributes of the view model. Applications specify these to configure the view model.

The view model is conceptual in the sense that an implementation on a graphics device actually may perform an operation in a coordinate system other than the one where the application specifics it as long as the result is the same. Device pipelines do this for improved performance.

Prior art high performance graphics devices typically retain view model states such as matrices, lights, and clip planes. But they are more restrictive than the conceptual view model. For example, they typically require the MC-to-CC and CC-to-DC matrices (CC is Clipping Coordinates, which is not exposed at the application program interface [API] level), and lights in MC and LC (LC is Lighting Coordinates, which is not exposed at the API level). These items are derived from the API view model attributes. When an application changes an attribute, an item derived from that attribute becomes invalid. It must be recalculated, and the device must be informed of the change so that the device pipeline can reload the derived item into the device. In some prior art systems, when an application program sets a view model attribute in the context, all invalidated items are recalculated at the time of change to the attribute. This results in unnecessary calculations at every stage in the pipeline and consumes unnecessary system overhead because an application may change several view model attributes before sending a graphics primitive. Each attribute change results in a complete recalculation.

A graphics primitive is a function that takes geometry in MC, passes it through the geometry pipeline for transformation and clipping, and renders it in DC. An example of a primitive is polyline, which is an ordered set of vertices with each pair connected by a line segment. The polyline primitive takes at least two vertices in MC, transforms the vertices to CC, clips the polyline so that no geometry extends outside or the viewing rectangle, transforms the clipped vertices to DC, and renders the line segments between each pair of vertices.

Another example of a primitive is annotation text, which is a character string where each character is rendered with polylines. Font files hold a description of the polyline representation of each character. The annotation text primitive takes a character string and a reference point in MC and transforms the reference point to VDC. If the reference point is inside the viewing rectangle, it builds a polyline representation of the character string in VDC. It would be extremely convenient if a pipeline could send these polylines to the polyline primitive above so that the annotation primitive does not have to duplicate the remainder of the geometric pipeline and the entire rendering pipeline. Unfortunately, the text is in VDC now, and the polyline primitive expects geometry in MC. This poses a problem. Therefore, it would be desirable if a device interface would support entry of items from a variety of coordinate systems, as the device pipeline requires.

One prior art method of changing context and its effect on the graphics pipeline will now be discussed. This method will be known as "dumb evaluation" because the system does not account for subsequent changes to the specified or subsequent contexts prior to performing calculations. Using this prior art technique, first, an application may set view model attributes in context. Upon a detection of this change, the system will then store the values in memory and calculate nothing. Subsequent to this operation, the application may then call a graphics primitive, such as that requiring the rendering of an object. The geometry can then be passed to the device pipeline (DP), and the DP calculates "derived" items (those changing in subsequent view models due to the changes in the specified context) from view model attributes specified in the given context. The DP loads derived items into a device (sometimes a hardware graphics accelerator), and the DP sends the geometry to the device. The disadvantage of this technique is that if the view model attributes do not change between graphics primitives (a very common occurrence) then derived items are calculated and loaded unnecessarily into the device. These calculations reduce overall system performance.

A second prior art technique is known as "automatic evaluation." Using this technique, an application program can set a view model's attributes in a specified context, and those changes are stored into memory. Then, the derived items, may be recalculated from the view model attributes and they are stored into memory referenced by the context. Subsequent to these operations, the application program may call a graphics primitive. At this point, geometry is passed to the DP and the DP gets precalculated derived items (from the changes in context performed above) from the context and loads them into the device. Then, the DP sends the geometry to the device. The disadvantages of this technique are that if the application sets several view model attributes between graphics primitives (a not uncommon occurrence) then all derived items from the changes in contexts will be re-evaluated after each change to the view model. All calculations occurring before the last change to the view model thus are unnecessary. These extraneous calculations reduce overall graphics performance. Also, a DP may need only a small subset of the derived items supported for the given changes to the context(s).

Thus, prior art computer graphics systems suffer from numerous deficiencies.

SUMMARY OF THE INVENTION

A method and apparatus in a computer system, for maintaining a computer graphics interface between an application program and device pipeline. The computer system implements a view model including a plurality of coordinate systems. An acyclic graph is stored, wherein the acyclic graph represents dependencies between various items in each of the plurality of coordinate systems. Then, upon a creation of an item in a first coordinate system of the plurality of coordinate systems, an object is associated with the item. The object associates all derived items from the item in others of the plurality of coordinate systems. The object includes a first flag for indicating whether the current item is valid within the first coordinate system. The object further includes a second flag for indicating that at least one of the derived items is not valid in its respective coordinate system. Upon requests for the item by the application program, it is determined whether the item is valid, and if not, then the acyclic graph is descended to determine when one of the derived items is valid. When one valid item is found, the item is calculated and it is indicated that the one item is valid. Then, the acyclic graph is ascended, each derived item is calculated, and it is indicated that each derived item is valid until reaching the requested item. Then, the requested item is calculated, indicating that it is valid and the requested item is presented to the application program. The storage of the object further allows entry of geometric data from multiple coordinate systems, and provides a fast test to indicate that derived items are invalid.

BRIEF DESCRIPTION OF THE DRAWINGS

The present invention is illustrated by way of example and not limitation in the figures of the accompanying in which like references indicate similar elements and in which:

FIG. 1 illustrates a system upon which one embodiment of the present invention may be implemented.

FIG. 2 illustrates the software architecture used in implemented embodiments of the present invention, including an application program, the device interface and device pipelines.

FIG. 3 illustrates a view model used in implemented embodiments of the present invention.

FIG. 4 illustrates the set of objects used in implemented embodiments of the present invention.

FIGS. 5a and 5b illustrate an acyclic graph used for representing dependencies and derived items in implemented embodiments of the present invention.

FIG. 6 illustrates a method performed during the update of items in a current view model.

FIGS. 7a and 7b illustrate a method performed when invalid item(s) are requested by a device pipeline.

DETAILED DESCRIPTION

Figure 5A:
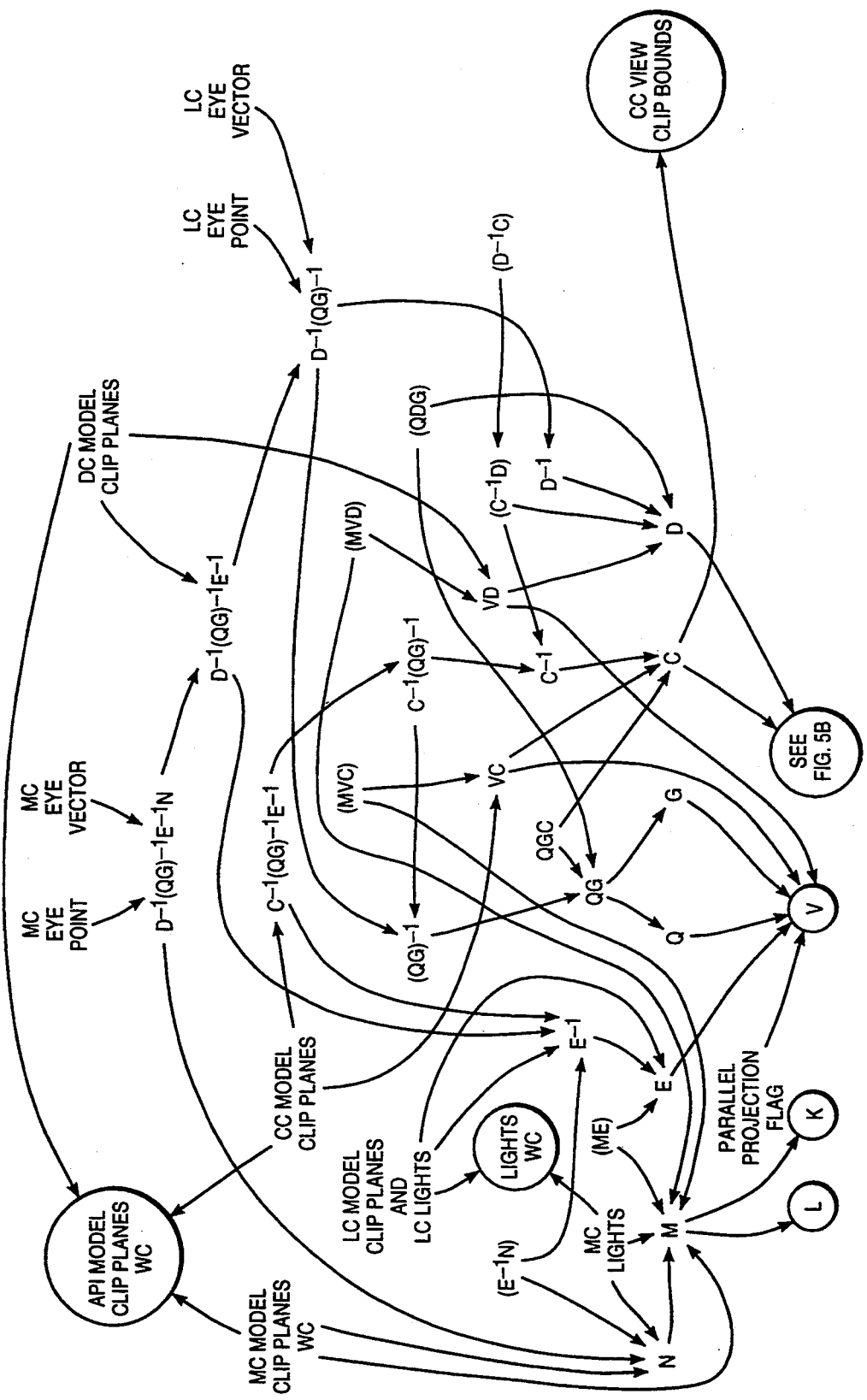

The present invention describes a computer graphics system which improves performance by setting values in specified coordinate systems, and only calculating derived items from those values at such time as absolutely necessary. In the following description, for the purposes of explanation, certain specific embodiments are set forth describing specific signals, representations of data, specific hardware platforms upon which certain components may be implemented, and method steps, in order to provide a thorough understanding of the present invention. It will be apparent to one skilled in the art, however, that the present invention may be practiced without some of the specific details. Also, in the following description, certain well known circuits and certain method steps are illustrated in block-diagram form in order to not unnecessarily obscure the present invention.

A portion of the disclosure of this patent document contains material which is subject to copyright protection and to which a claim of copyright protection is made. The copyright owner has no objection to the facsimile reproduction by anyone of the patent disclosure, as it appears in the Patent and Trademark Office patent files or records, but otherwise reserves all copyrights and similar rights whatsoever. ©Copyright 1993 Sun Microsystems Inc., all rights reserved.

System in One Embodiment of the Present Invention

Referring to FIG. 1, a system upon which one implementation of the present invention is implemented is shown as 100. 100 comprises a bus or other communication means 101 for communicating information, and a processing means 102 coupled with bus 101 for processing information. System 100 further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. System 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. This may be used for storage of the databases to be described here which maintain information about currently defined problem descriptions using commercially available software products.

System 100 may further be coupled to a display device 121, such as a cathode ray tube (CRT) or liquid crystal display (LCD) coupled to bus 101 for displaying information to a computer user. Such a display 121 may further be coupled to bus 101 via a frame buffer 110, which information such as a single or multiple frames or images for display upon display device 121. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121.

Note, also, that any or all of the components of system 100 and associated hardware may be used in various embodiments, however, it can be appreciated that any configuration of the system may be used for various purposes according to the particular implementation.

In one embodiment, system 100 is one of the Sun Microsystems® brand family of workstations such as the SPARCstation workstations manufactured by Sun Microsystems® of Mountain View, Calif. Processor 102 may be one of the SPARC brand microprocessors manufactured by Sun Microsystems® of Mountain View, Calif. (Sun Microsystems ® of Mountain View, Calif.).

Note that the following discussion of various embodiments discussed herein will refer specifically to a series of routines which are generated in a high-level programming language (e.g., the C++ language) and compiled, linked, and then run as object code in system 100 during run-time, for example by the SPARCompiler available from Sun Microsystems® of Mountain View, Calif. Specifically, the present invention is operative in conjunction with various software libraries, such as the Solaris® XGL computer graphics package available from SunSoft, Inc. of Mountain View, Calif. (Sun, Sun Microsystems, XGL, and Solaris are trademarks of Sun Microsystems of Mountain View, Calif. SPARC and SPARCstation are trademarks of SPARC International, Inc. and are licensed exclusively to Sun Microsystems). It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Software Architecture

Implemented embodiments of the present invention run within a window environment managed by an X11-R5 compatible server, such as the X11/NeWS ™ servers within the Sun ® Microsystems brand OpenWindows ™ environment. Application programs perform various graphics operations by calling graphics operations from an Application Program interface (API). The API provides the functionality here to support derived items. The API's which may be used in various implementations of the present invention include those using a GKS and PHIGS interface.

As illustrated in FIG. 2, the software architecture in implemented embodiments of the present invention relies upon application programs 201 transmitting requests to a device-independent graphics framework 202 which, based on calls from application programs 201, provides certain information either to a device pipeline 204 or a software pipeline 203. In this way, when graphics primitives are invoked by an application program, calculations and other operations required by the primitives may be performed and the geometry required by the program may be passed to either the device pipeline 204 or the software pipeline 203. As will be discussed, if operations do not need to be performed immediately, that is, they can be deferred to some later time, the framework 202 will not pass any data directly to the pipelines 203 or 204. The framework will therefore perform operations such as calculations and/or passing data to the pipelines only when absolutely required and when it is most efficient. In this way, performance of the overall system is improved.

In implemented embodiments, a view model is a series of coordinate systems in which various parameters may be specified. One example of a view model which is used in implemented embodiments of the present invention is illustrated with reference to FIG. 3. 300 of FIG. 3 shows a three-dimensional view model which includes a plurality of coordinate systems at which various attributes may be set. In FIG. 3, coordinate systems are shown with a simple abbreviation (e.g. GMC for Global Model Coordinates, as discussed in the background above), and transforms or matrices used for calculating items in one coordinate system to another are shown with an abbreviation surrounded by a square (e.g. the matrix L 311 for the MC 301 to GMC 302 transform). These coordinate systems are similar in application to those used in other prior art systems, including PHIGS, which is described in Foley, van Dam, Feiner and Hughes, *Computer Graphics: Principles and Practice* (2d Ed. 1990), at pp. 279–281. The coordinate systems used in implemented embodiments of the present invention include those available to and settable by application programs (known as "API-visible" coordinate systems and transforms) which are shown to the left of the partition line 350 in FIG. 3, and those used internally in the embodiments of the present invention shown to the right of the partition line 350.

For example, as shown in FIG. 3, the application program may specify attributes in Global Model Coordinates 302 which may be then transformed by the matrix known as the K or Global Model transform 312. In addition, certain coordinate systems use transforms which are visible to the application program and those which are not. For example, certain items in the Virtual Device Coordinate system 304 relies upon data transformed from the World Coordinate system 303 by the View Transform 313, and data in Lighting Coordinates 361 transformed by the QG transform 352. Model transforms provided in implemented embodiments of the present invention may also be concatenated for transforming items created in a first coordinate system and a second succeeding coordinate system. For example, items created in Model Coordinates 301 may be transformed into items residing in World Coordinates 303 by concatenating the matrix 311 with the matrix 312. Thus a single transform, the MC-to-WC transform may be created which is used for transforming items in Model Coordinates 301 to items in World Coordinates 303.

View Model Derived Data

Items calculated from the view model attributes specified by the application are known as derived items.

Implemented embodiments of the present invention define a conceptual view model consisting of a number of coordinate systems wherein an application at layer 201 in FIG. 2 can specify certain operations. Implemented embodiments of the present invention provide a facility in the pipeline interface named View Model Derived data to assist pipelines with implementation of the view model's operations.

Derived data maintains a cache of items derived from a context's view model attributes. The derived items include Transforms, such as those discussed above, for mapping geometry between coordinate systems as well as items in various coordinate systems such as the view clip bounds, lights, eye positions or eye vectors, model clip planes, and depth cue reference planes. For example, derived data calculates the VDC-to-DC Transform from the Context attributes for the VDC map, VDC orientation, VDC window, DC viewport, and jitter offset, and the Device attribute for DC orientation. Thus, a derived item can depend on only API-set attributes, on only derived items, or on a combination or both.

Components of the Derived Data Mechanism

Implemented embodiments of the present invention use an object-oriented approach to supporting the implementation of derived data. The central object of the derived data mechanism is the view cache object. The view cache consists of derived items and functions for deferred evaluation of the items. Each Context has a pointer to its own view cache, which maintains the derived items specific to that Context. A view cache object is created at Context creation time by a constructor in the Context object.

The Context constructor creates a set of Transform objects that represent its default transformations (Local Model Transform, etc.) and creates the view cache object. The view cache constructor creates internal Transforms that are needed by derived data. The view cache constructor also creates a set of view group configuration objects, each of which represents a coordinate system from which geometry can enter a LI-1 (the loadable interface) primitive.

The view group interface object is the pipeline's interface to the view model derived data. It informs a pipeline when derived items have changed as a result of either the application changing a view model attribute or a pipeline changing the coordinate system from which geometry enters the next primitive. The view group interface constructor is created when the pipeline context object is created.

The view group interface has functions for creating and destroying view concern objects. A view concern object is a description of all the derived items about which a pipeline is concerned. A pipeline may create as many view concern objects as it needs.

FIG. 4 illustrates the set of objects in the derived data mechanism in a three-dimensional context. This example shows a 3D Context 420 with one view concern object for stroke primitives 427 and another for surface primitives 426. Note that for 3D Contexts, them are five view group configuration ViewCache objects 400. The derived items in this figure include the transforms, for various coordinate systems, 401–405. A view cache object consists of derived items and functions for deferred evaluation of the items. Each Context has a pointer to its own view cache object, which maintains the derived items specific to that Context.

A view group configuration object (e.g. each of items 400) holds static configuration information for each coordinate system from which geometry can enter LI-1. Each view cache has an array of view group configuration objects, one for each coordinate system that the view cache supports. A 2D view cache supports MC, VDC, CC, and DC. A 3D view cache supports these four as well as LC, as illustrated in FIG. 3. The configuration information is static: it is invariant once initialized and is common to all view caches of a particular dimension.

A view group interface object (e.g. 424 or 425) is a pipeline's interface to the view model derived data. This object informs a pipeline when derived items have changed as a result of either the application changing a view model attribute or a pipeline changing the coordinate system from which geometry enters the next LI-1 primitive. The view group interface also maintains functions for returning the items appropriate to the current coordinate system.

A view concern object (e.g. 426 or 427) is a description of all the derived items whose changes a pipeline is concerned with. This object is a parameter of the view group interface's fast test for changes to derived items.

Each pipeline has a pointer to a view group interface object (e.g. 424 or 425). The view group interlace has functions for creating and destroying view concern objects. A pipeline may create as many view concern objects as it needs. For example, it can have one for stroke primitives and one for surface primitives (e.g. 426 and/or 427).

How Derived Data Gets Information From the Context

There are two ways that Context state can change: the application can directly set a Context attribute, or the application can change an object used by the Context, causing the object to send a message to the Context about the change. Either of these two types of changes can cause derived data to change.

The Context has a number of attributes that the application can set, among which are the view model attributes. For example, if the application changes the VDC window using a function object_set() to set a context variable CTX_VDC_WINDOW, a number of derived items that are dependent on the value of the VDC window become invalid. But, because the changes are evaluated lazily, the derived data items are not recalculated until the pipeline requests the items.

If the member datum in the Context of the VDC window is changed, the Context informs the view cache object that the application changed the VDC window by calling a function in the view cache object. This function invalidates the derived items that depend on the VDC window. A set of bits records which derived items changed.

Some Context attributes that are objects, such as Lights, Transforms, or the Device, can change, causing derived data items to change. For example, if an application gets the Local Model Transform and changes it, the Transform sends a message to each Context that uses the Transform. If the Context is interested in the change to the Transform, it will call a view cache function to invalidate derived items that depend on the Local Model Transform. This process is similar for changes to Lights and for Device resizes.

Derived Data and the Interface Manager

Derived data changes are propagated from the Context's view cache to the pipeline's view group interface object by the interface manager. When the Context stores changes in the view cache object, the information is not sent to the pipelines until the interface manager is invoked at rendering time. At this time, the interface manager tells the view group interface to mark its set of change bits to reflect the changes in the view cache object. The view group interface object accesses the derived data information in the view cache object to get the current change bits and marks its bits. The pipeline will call the function changedComposite() to determine whether a derived item has changed. If changedComposite() returns TRUE, the pipeline checks the change functions for individual items to determine which ones changed.

Acyclic Graph

Implemented embodiments of the present invention use an acyclic graph to determine which item(s) are derived from other item(s). As discussed previously, these include transforms and other items, including viewer position, light position, clip planes, viewports, etc. Each derived item declined in the system in implemented embodiments contains references, in the form of direct function calls for evaluating other items which have validity flags. In this way, when a view model attribute is modified by the application program, derived items dependent upon that attribute change, are invalidated during the change. No calculations are performed at the time of an attribute change. Once the device pipeline requests one of the invalid derived items, then the calculations may be performed. This is performed by descending the acyclic graph until valid item(s) are reached, and then calculating invalid item(s) back up the acyclic graph, clearing invalid flags for the item(s) until the item requested is reached, whose invalid flag is then cleared.

The acyclic directed graph describes the derived items that become invalid upon a change in value to any view model attribute. It also describes the dependencies of each derived item on other items, and hence an optimal evaluation traversal for any derived item requested by a pipeline. The acyclic graph used in implemented embodiments of the present invention is illustrated with reference to FIGS. 5a and 5b. Although FIGS. 5a and 5b illustrate a complex series of interdependencies used in derived data in one implemented embodiment in order to determine whether item(s) are valid/invalid, and/or have to be recalculated, it can be appreciated by one skilled in the arts that a system using a different view model than that described with reference to FIG. 3 may use a different acyclic directed graph. It is important, however, that the dependencies be represented in some form (e.g. a data structure such as a linked list, an array or series of direct function calls, etc.) in some manner so that the advantages of derived data may be exploited.

In the acyclic directed graph represented in FIGS. 5a and 5b, dependencies are represented in the direction of the arrows and, therefore, the order for evaluating derived items is opposite the direction of the arrows. Also, although direct function calls are used in implemented embodiments for the acyclic directed graph, it can be appreciated that in alternative embodiments that pointers, indices or other references can be used to determine derived items, and whether the derived item(s) have been updated.

In the graph, the matrices required by specific coordinate systems are shown in table 1 below. As can be appreciated by one skilled in the art, the matrices L and K change frequently because their corresponding coordinate systems (Model Coordinates and Global Model Coordinates) are most frequently updated by an application program:

TABLE 1

| Coordinate System | Matrices | Purpose |
|---|---|---|
| MC- > GMC (local) | L | API modeling |
| GMC- > WC (Global) | K | API modeling |
| WC- > VDC (View) | V = EQG | API viewing, to be factored |
| VDC- > DC (Device) | D | Device mapping (derived from API) |
| DC- > VDC | $D^{-1}$ | Intermediate step |
| VDC- > CC | C | View clip planes |
| CC- > VDC | $C^{-1}$ | Intermediate step |
| VDC-WC | $((QG)^{-1})E^{-1})$ | Intermediate step |
| WC- > CC | VC | Model clip planes |
| CC- > WC | $(C^{-1})((QG)^{-1})(E^{-1})$ | Model clip planes |
| WC- > DC | VD | Model clip planes |
| DC- > WC | $(D^{-1})((QG)^{-1})(E^{-1})$ | Model clip planes |
| DC- > MC | $(D^{-1})((QG)^{-1})(E^{-1})N$ | Eye, facet nominal |
| DC- > LC | $(D^{-1})((QG)^{-1})$ | Eye |
| MC- > WC (Model) | M = LK | Lights, model clip planes, eye |
| WC- > MC (Normal) | $N = M^{-1}$ | Lights, model clip planes, eye |
| WC- > LC | E | Lights |
| LC- > WC | $E^{-1}$ | Lights |
| MC- > DC | M(VD) | Points |
| MC- > CC | M(VC) | Points |
| CC- > DC | $(C^{-1})D$ | Points |
| LC- > VDC | QG | Intermediate Step (sparse) |
| VDC- > LC | $(QG)^{-1}$ | Intermediate Step (sparse) |
| CC- > LC | $(C^-)(QG)^{-1})$ | Points |
| LC- > DC | (QG)D | Points |
| MC- > LC | ME | Points |
| LC- > MC | $(E^{-1})N$ | Normals |

Note that similar labels in FIGS. 5a and 5b refer to the same items, and the graph represented has been partitioned into two figures for convenience.

Fast Test

Implemented embodiments of the present invention also use a fast test in order to enable the determination of whether derived items are valid or invalid. The fast test is also known and referred to as the changedComposite() function in implemented embodiments of the present invention. If the fast test yields that a particular derived item is changing because an item upon which that item is derived changed, then individual items are checked for changes. The pipeline requests changed items, causing a traversal of the directed graph, in the manner discussed above, until an item is reached that is valid, and the invalid item(s) are calculated back through the graph until the requested item is reached, which may be then calculated.

Derived data allows device pipelines to specify the derived items about which they are concerned with changes so that irrelevant changes are filtered out. Each pipeline has an interface to the derived items in the cache. The interface consists of two flag words. A bit of each represents a derived item. One flag word stores changes to items caused by changes to API view model attributes. The other stores unacknowledged changes in the current coordinate system from which geometry enters. These two words are used in the fast test so that a primitive can quickly check whether a pipeline needs to reload derived items. The bits in the first flag word are updated when the application sets a view model attribute. The second flag word is updated by a precomputed table: each entry is for a specific pair of coordinate systems. When a pipeline changes coordinate systems, say from MC to LC, the precomputed bit pattern is taken from the precomputed table and combined with the second flag word.

The interface has a pointer for each derived item to an evaluation function in the cache. For example, two derived items are the MC-to-CC matrix and the LC-to-CC matrix. If the current coordinate system is MC, the interface sets the MC-to-CC pointer to the MC-to-CC evaluation function. If a pipeline changes the current coordinate system to LC, the interface sets the MC-to-CC pointer to the LC-to-CC evaluation function. This allows a pipeline to get and reload the correct matrix without the burden of being aware of the current coordinate system. This is an example of a mapping for supporting entry of geometry from multiple coordinate systems.

Detail of Implementation

The following is a detail of an example implementation of 2-dimensional geometry in a graphics library known as XGL including references to source code wherein the source code language shown is C++.

1. Creation of a View Cache

An XGL application creates a 2D graphics Context. In turn, each Context creates its own View Cache. The View Cache contains an array of View Group Configurations (one per coordinate system from which geometry enters LI-1). The constructor for XglViewCache2d initializes the information in each View Group Configuration, which consists of a flag table and a set of pointers to evaluation functions. There is one table element and one pointer for each derived item.

1(a). Indices and Bits Corresponding to Derived Items

Each derived item is assigned a bit in a view flag word. The bit index starts at 0 and increases incrementally (0, 1, 2 . . . ).

```
enum Xgli_view_idx_a {
    // Derived data
    XGLI_VIEW_IDX_A_MC_TO_DC = 0,
    XGLI_VIEW_IDX_A_MC_TO_CC,
    XGLI_VIEW_IDX_A_CC_TO_DC,
    XGLI_VIEW_IDX_A_MC_TO_WC,
    XGLI_VIEW_IDX_A_YDC_TO_CC,
    XGLI_VIEW_IDX_A_CC_TO_VDC,
    XGLI_VIEW_IDX_A_WC_TO_CC,
    XGLI_VIEW_IDX_A_VDC_TO_DC,
    XGLI_VIEW_IDX_A_DC_TO_VDC,
    XGLI_VIEW_IDX_A_WC_TO_DC,
    XGLI_VIEW_IDX_A_DC_TO_CC,
    XGLI_VIEW_IDX_A_MC_TO_VDC,
    XGLI_VIEW_IDX_A_DC_TO_MC,
    XGLI_VIEW_IDX_A_YC_TO GMC,
    XGLI_VIEW_IDX_A_GMC_TO_WC,
    XGLI_VIEW_IDX_A_WC_TO_VDC,
    XGLI_VIEW_IDX_A_VCLIP_BOUNDS_VDC,
    XGLI_VIEW_IDX_A_VCLIP_BOUNDS_CC,
    XGLI_VIEW_IDX_A_VCLIP_BOUNDS_DC,
    XGLI_VIEW_IDX_A_VCLIP_BOUNDS_MC,
    XGLI_VIEW_IDX_A_VCLIP_ACTIVITY,
    XGLI_VIEW_IDX_A_VIEWPORT_DC
};
```

Then the bit assigned to a derived item is obtained by shifting 1 to the left by the index.

```
static const Xgl_usgn32  XGLI_VIEW_A_MC_TO_DC
                         = 1 << XGLI_VIEW_IDX_A_MC_TO_DC;
static const Xgl_usgn32  XGLI_VIEW_A_MC_TO_CC
                         = 1 << XGLI_VIEW_IDX_A_MC_TO_CC;
static const Xgl_usgn32  XGLI_VIEW_A_CC_TO_DC
                         = 1 << XGLI_VIEW_IDX_A_CC_TO_DC;
static const Xgl_usgn32  XGLI_VIEW_A_MC_TO_WC
                         = 1 << XGLI_VIEW_IDX_A_MC_TO_WC;
static const Xgl_usgn32  XGLI_VIEW_A_VDC_TO_CC
                         = 1 << XGLI_VIEW_IDX_A_VDC_TO_CC;
static const Xgl_usgn32  XGLI_VIEW_A_CC_TO_VDC
                         = 1 << XGLI_VIEW_IDX_A_CC TO_VDC;
static const Xgl_usgn32  XGLI_VIEW_A_WC_TO_VDC
                         = 1 << XGLI_VIEW_IDX_A_WC_TO_CC;
static const Xgl_usgn32  XGLI_VIEW_A_VDC_TO_DC
                         = 1 << XGLI_VIEW_IDX_A_VDC_TO_DC;
static const Xgl_usgn32  XGLI_VIEW_A_DC_TO_VDC
                         = 1 << XGLI_VIEW_IDX_A_DC_TO_VDC;
static const Xgl_usgn32  XGLI_VIEW_A_WC_TO_DC
                         = 1 << XGLI_VIEW_IDX_A_WC_TO_DC;
static const Xgl_usgn32  XGLI_VIEW_A_DC_TO_CC
                         = 1 << XGLI_VIEW_IDX_A_DC_TO_CC;
static const Xgl_usgn32  XGLI_VIEW_A_MC_TO_VDC
                         = 1 << XGLI_VIEW_IDX_A_MC_TO_VDC;
static const Xgl_usgn32  XGLI_VIEW_A_DC_TO_MC
                         = 1 << XGLI_VIEW_IDX_A_DC_TO_MC;
static const Xgl_usgn32  XGLI_VIEW_A_MC_TO_MC
                         = 1 << XGLI_VIEW_IDX_A_MC_TO_MC;
static const Xgl_usgn32  XGLI_VIEW_A_GMC_TO_WC
                         = 1 << XGLI_VIEW_IDX_A_GMC_TO_WC;
static const Xgl_usgn32  XGLI_VIEW_A_WC_TO_VDC
                         = 1 << XGLI_VIEW_IDX_A_WC_TO_VDC;
static const Xgl_usgn32  XGLI_VIEW_A_VCLIP_BOUNDS_VDC
                         = 1<<XGLI_VIEW_IDX_A_VCLIP_BOUNDS_VDC;
static const Xgl_usgn32  XGLI_VIEW_A_VCLIP_BOUNDS_CC
                         = 1 << XGLI_VIEW_IDX_A_VCLIP_BOUNDS_CC;
static const Xgl_usgn32  XGLI_VIEW_A_VCLIP_BOUNDS_DC
                         = 1 << XGLI_VIEW_IDX_A_VCLIP_BOUNDS_DC;
static const Xgl_usgn32  XGLI_VIEW_A_VCLIP_BOUNDS_MC
                         = 1 << XGLI_VIEW_IDX_A_VCLIP_BOUNDS_MC;
static const Xgl_usgn32  XGLI_VIEW_A_VCLIP_ACTIVITY
                         = 1 << XGLI_VIEW_IDX_A_VCLIP_ACTIVITY;
```

```
-continued
static const Xgl_usgn32   XGLI_VIEW_A_VIEWPORT_DC
                        = 1 << XGLI_VIEW_IDX_A_VIEWPORT DC;
```

Wherein Xgl_usgn32 is an unsigned 32-bit word.

1(b). Initialization of a View Cache's Array of View Group Configurations

Each flag table element in the View Group Configuration correspond to an index shown above. For example, XGLI_VIEW_IDX_A_MC_TO_CC is 1 so the flag table element whose index is 1 corresponds to the MC-to-CC Transform.

A View Group Configuration stores the mappings for supporting entry of geometry from a particular coordinate system. An example of a mapping: when the current coordinate system is VDC and a pipeline requests the MC-to-CC Transform, then derived data should return the VDC-to-CC Transform. So in the View Group Configuration for VDC, MC-to-CC maps to VDC-to-CC. This requires the following initialization in the form of a macro for simplifying the definition of all the mappings in the view group configurations.

```
// CACHE2D_SET_DD sets up the flag table and the configuration for derived data.
// COORD_SYS is the coordinate system of the incoming geometry.
// DOMAIN is the flag mask of the virtual derived data item.
// RANGE is the flag mask of the actual derived data item adjusted for the
// coordinate system.
// DD_PTR is the name of the pointer to the evaluation function for the
// derived data item adjusted for the coordinate system.
// EVAL_FUNC is the name of the evaluation function for the derived data item
// adjusted for the coordinate system.
//
#define CACHE2D_SET_DD(COORD_SYS, DOMAIN, RANGE, DD_PTR, EVAL_FUNC)
setFlagTable (config[COORD_SYS].flagTable, DOMAIN, RANGE);
config[COORD_SYS].DD_PTR = XglViewCache2d: :EVAL_FUNC;
```

For example, the following macro invocation is in the constructor function XglViewCache2d::XglViewCache2d:

```
CACHE2D_SET_DD(XGLI_LI1_2D_COORD_SYS_VDC, XGLI_VIEW_A_MC_TO_CC,
XGLI_VIEW_A_VDC_TO_CC, ptrMcToCc, evalVdcToCc)
```

The C++ preprocessor expands this to:

```
setFlagtable (config [XGLI_LI1_2D_COORD_SYS_VDC] flagTable,
XGLI_VIEW_A_MC_TO_CC, XGLI_VIEW_A_VDC_TO_CC);
config[XGLI_LI1_2D_COORD_SYS_VDC].ptrMcToCc = XglViewCache2d::evalVdcToCc;
```

This is the configuration that accomplishes the mapping. The flag table with the element corresponding to XGLI_VIEW_A_MC_TO_CC is set to XGLI_VIEW_A_VDC_TO_CC. The pointer to the function for getting the MC-to-CC Transform is set to the evaluation function for VDC-to-CC.

The following function sets the flag table:

```
// setFlagTable sets one entry of a flag table in a configuration.
// domain is a flag mask unadjusted for coordinate system.
// range is a flag mask adjusted for coordinate system.
//
void XglViewCache2d::setFlagTable (Xgl_usgn32 flag_table[],
                                    const Xgl_usgn32 domain,
                                    const Xgl_usgn32 range)
{
// TRACE(*XglViewCache2d::setFlagTable*);
flag_table [leastSigOnBitPosition (domain)] = range;
```

```
-continued
}
``` leastSigOnBitPosition() is a function that returns the index of the least significant bit which is on (i.e. set to 1). In the example above, this converts XGLI_VIEW_A_MC_TO_CC to XGLI_VIEW_IDX_A_MC_TO_CC, which is the index into the flag table.

Mappings must be set up for each derived item supported. One set of mappings is required for each coordinate system supported for which there is a View Group Configuration.

In 2D, derived data supports four coordinate systems from which geometry can enter LI-1:

```
//
// LI1 accepts geometry from the following 2D Coordinate
Systems
//
```

```
enum Xgli_li1_2d_coord_sys {
XGLI_LI1_2D_COORD_SYS_MC = 0,
XGLI_LI1_2D_COORD_SYS_VDC,
XGLI_LI1_2D_COORD_SYS_CC,
XGLI_LI1_2D_COORD_SYS DC
};
```

The array of View Group Configurations in the View Cache is static. Once initialized, the mappings never change again. The array is also shared by all View Cache objects so it needs to be initialized only when the first View Cache object is created.

1(c). Initialization of the Coordinate System Change Flag

A Device pipeline usually retains state. For example, a graphics accelerator may have hardware registers for storing the matrices of the MC-to-CC and CC-to-DC Transforms. A Dp usually needs to update the registers when an application changes a view model attribute or when a pipeline changes the current coordinate system.

Consider a simple example of 2D annotation text in the software pipeline. The application passes a character string and a reference point to XGL at the API level. If the device pipeline cannot handle annotation text at LI-1, the software pipeline transforms the reference point from MC to VDC, checks that the point is within the view clip bounds, and constructs a polyline description of the text based on information stored in font files. Derived data provides functions so that a primitive can push the current coordinate system onto a stack and set it to another: VDC in the case of annotation text. Then the primitive can call LI-1 multipolyline. When the multipolyline function requests a transform, for example the MC-to-CC Transform, derived data returns the appropriate transform for the current coordinate system: in this case, the VDC-to-CC Transform. The LI-1 multipolyline primitive doesn't need to be aware that the current coordinate system is VDC instead of MC. When control returns from the LI-1 polyline primitive to the software pipeline's LI-1 annotation text primitive, the latter can pop the coordinate system to restore the original one (which should be MC).

A pipeline typically changes current coordinate systems when it has decomposed a complex primitive into simple primitives in a coordinate system other than MC. Then the simple primitives can be sent to the appropriate LI-1 function for further geometry processing and rendering. Derived data simplifies the development effort required to implement LI-1 functions because they can be written as if geometry always enters from MC.

The View Cache maintains a matrix of flags to keep track of coordinate system changes that may require a pipeline to reload the retained state. The matrix's first index is the previous coordinate system (before the change); the second is the current coordinate system (after the change). The matrix is asymmetric. The diagonal is NULL (i.e. 0) because the diagonal elements represent no change in the coordinate systems.

The following code in XglViewCache2d::XglViewCache2d() initializes the matrix of coordinate system change flags:

```
//
// Initialize matrix of flags indicating the derived data items that may
// have been affected by a change in coordinate systems of the incoming
// geometric data for LI1.
//
// This matrix gives only an estimate of what may have changed. It may
// generate some false alarms, but it should never miss a change to a
// data item.
//
coordSysChangeFlag[XGLI_LI1_2D_COORD_SYS_M][XGLI_LI1_2D_COORD_SYS_MC]
   = NULL;
coordSysChangeFlag[XGLI_LI1_2D_COORD_SYS
VDC]][XGLI_LI1_2D_COORD_SYS_VDC]
   = NULL;
coordSysChangeFlag[XGLI_LI1_2D_COORD_SYS_CC][XGLI_LI1_2D_COORD_SYS_CC]
   = NULL;
coordSysChangeFlag[XGLI_LI1_2D_COORD_SYS_DC][XGLI_LI1_2D_COORD_SYS_DC]
   = NULL;
setCoordSysChangeFlag
(XGLI_LI1_2D_COORD_SYS_MC,
config[XGLI_LI1_2D_COORD_SYS_MC].flagTable,
XGLI_LI1_2D_COORD_SYS VDC,
config[XGLI_LI1_2D_COORD_SYS_VDC].flagTable);
setCoordSysChangeFlag
(XGLI_LI1_2D_COORD_SYS_MC,
config[XGLI_LI1_2D_COORD_SYS_MC].flagTable,
XGLI_LI1_2D_COORD_SYS_CC,
config[XGLI_LI1_2D_COORD_SYS_CC].flagTable);
setCoordSysChangeFlag
(XGLI_LI1_2D_COORD_SYS_MC,
config[XGLI_LI1_2D_COORD_SYS_MC].flagTable,
XGLI_LI1_2D_COORD_SYS_DC,
config[XGLI_LI1_2D_COORD_SYS_DC).flagTable);
setCoordSysChangeFlag
(XGLI_LI1_2D_COORD_SYS_VDC,
config[XGLI_LI1_2D_COORD_SYS_VDC].flagTable,
XGLI_LI1_2D_COORD_SYS_CC,
config[XGLI_LIJ_2D_COORD_SYS_CC].flagTable);
setCoordSysChangeFlag
(XGLI_LI1_2D_COORD_SYS_VDC,
config[XGLI_LI1_2D_COORD_SYS_VDC].flagTable,
XGLI_LI1_2D_COORD_SYS_DC,
config[XGLI_LIJ_2D_COORD_SYS_DC].flagTable);
setCoordSysChangeFlag
(XGLI_LI1_2D_COORD_SYS_CC,
config[XGLI_LI1_2D_COORD_SYS_CC].flagTable,
XGLI_LI1_2D_COORD_SYS_DC,
config[XGLI_LI1_2D_COORD_SYS_DC].flagTable);
```

XglViewCache2d::setCoordSysChangeFlag() takes as parameters a pair of coordinate systems and their corresponding flag tables from the View Group Configurations. It initializes the coordinate system change flags for changes from the first coordinate system to the second as well as the second to the first.

```
// setCoordSysChangeFlag sets two entries matrix of coordinate
```

```
// system change flags given a pair of coordinate systems. Each
// entry describes the derived data items that map to different
// derived data items. These are the ones thae may need to be
// reloaded when a change in coordinate systems occurs.
//
void XglViewCache2d::setCoordSysChangeFlag
                    (const Xgli_li1_2d_coord_sys coord_sys_0,
                     const Xgl_usgn32 flag_table_0[],
                     const xgli_li1_2d_coord_sys coord_sys-1,
                     const Xgl_usgn32 flag_table_1[])
{
    TRACE(*XglViewCache2d::setCoordSysChangeFlag*);
    const Xgl_usgn32* flag_ptr_0;
    const Xgl_usgn32* flag_pcr_1;
    Xgl_sgn32 j;
    coordSysChangeFlag[coord_sys_0][coord_sys_1]=
    coordSysChangeFlag[coord_sys_1][coord_sys_0]= NULL;
    flag_ptr_0 = flag_table_0;
    flag_ptr_1 = flag_table_1;
    j = XGLL_VIEW_FLAG_TABLE_2D_SIZE;
    while (j--) {
        if (*flag_ptr_0 != *flag_ptr_1) {
            coordSysChangeFlag[coord_sys_0][coord_sys_1]
                |= *flag_ptr_1;
            coordSysChangeFlag[coord_sys_1][coord_sys_0]
                |= *flag_ptr_0;
        }
        flag_ptr_0++;
        flag_ptr_1++;
    }
}
```

Whenever the mappings differ between pair of coordinate systems, the change flags for the pair are updated by combining the flag word of the new coordinate system. For example, suppose the first coordinate system is MC and the second is VDC. If the mappings differ, the change flag for the transition from MC to VDC must include the flag word for VDC. For the transition from VDC to MC, the change flag must include the flag word for MC.

The matrix of coordinate system change flags is static. Once initialized, matrix is invariant because the mappings are static. The matrix is also shared by all View Cache objects so it needs to be initialized only when the first View Cache object is created.

This matrix is used in the last test called XglViewGrp2dItf::changedComposite().

2. View Concerns: Creation and Initialization

The Device pipeline (Dp) and Software pipeline (Swp) are the consumers for view model derived data. A pipeline typically is interested in only a few items which vary according to the graphics primitive. Surface primitives are more complex than stroke primitives so the former needs more derived items than the latter. Derived data allows pipelines to express concern about changes to items. A pipeline can create as many View Concerns as it needs. Typically, a pipeline will create one for stroke primitives and one for surface primitives.

To create a View Concern, a pipeline uses logical OR to combine bits corresponding to the derived items that need to be monitored for changes. The View Group Interface creates a concern by calling the View Concern's constructor, which in turn calls XglViewCache2d::setConcern() to initialize the View Concern:

```
// setConcern takes a flag with the bits -- corresponding to the derived
// data items of concern to a pipeline -- set to 1. For each coordinate
// system from which geometry can enter LI1, it adjusts the flag for that
// particular coordinate system.
//
void XglViewCache2d::setConcern (XglViewConcern2d* concern,
                                 const Xgl_usgn32 view_flag_2d) const
{
    TRACE(*XglViewCache2d::setConcern*);
    setConcernFlag (concern-> concernFlag[XGLI_LI1_2D_COORD_SYS_MC],
            view_flag_2d, config[XGLI_LI1_2D_COORD_SYS_MC].flagTable);
    setConcernFlag (concern-> concernFlag[XGLI_LI1_2D_COORD_SYS_VDC],
            view_flag_2d, config[XGLI_LI1_2D_COORD_SYS_VDC].flagTable);
    setConcernFlag (concern-> concernFlag[XGLI_LI1_2D_COORD_SYS_CC],
            view_flag_2d, config[XGLI_LI1_2D_COORD_SYS_CC].flagTable);
    setConcernFlag (concern-> concernFlag[XGLI_LI1_2D_COORD_SYS_DC],
            view_flag_2d, config[XGLI_LI1_2D_COORD_SYS_DC].flagTable);
}
```

XglViewCache2d::setConcern() simply calls XglViewCache2d::setConcernFlag() for each of the supported coordinate systems.

```
// setConcernFlag takes a flag with the bits -- corresponding to the derived
// data items of concern to a pipeline -- set to 1. using a flag table of
// a configuration for a particular coordinate system, this function
// adjusts the flag of concerns for the coordinate system.
//
void XglViewCache2d::setConcernFlag (Xgl_usgn32& concern_flag,
                                     const Xgl_usgn32 view_flag_2d,
                                     const Xgl_usgn32 flag_table[]) const
{
    TRACE(*XglViewCache2d::setConcernFlag*);
    Xgl_sgn32 j;
    Xgl_usgn32 mc_flag;
    const Xgl_usgn32 *flag_ptr;
    concern_flag = 0;
    flag_ptr = flag_table;
    if (view_flag_2d) {
        j = XGLI_VIEW_FLAG_MAX_MASK_BITS;
        mc_flag = view_flag_2d;
        while (j--) {
            if (mc_flag & 0x1) {
```

```
            concern_flag " = *flag_ptr;
        }
        mc_flag >>= 1;
        flag_ptr++;
    }
}
```

So for a particular coordinate system, setConcernFlag() initializes the coordinate system's concern flag by combining bits obtained as follows. The flag table maps bits set to 1 in the pipeline's view flag to bits appropriate for the target coordinate system. The mapped bits are combined to produce the concern flag for the target coordinate system.

3. The Fast Test for Detecting Changes to a Pipeline's Concerns

The View Group Interface is a pipeline's interface to the view model derived data stored and maintained by the View Cache. It tells the pipeline when derived items change, and gives the pipeline indirect access to derived items.

When an LI-1 primitive begins execution, it calls XglViewGrp2dItf::changedComposite() to determine if any of the derived items of interest have changed.

This function first checks if the View Cache's current coordinate system differs from the previous coordinate system of the pipeline. If so, the coordinate system change flag for this transition is combined with the "nack" flag for recording unacknowledged changes caused by changes in coordinate systems. The previous coordinate system of the pipeline is updated to be the View Cache's current coordinate system.

Then the pipeline's concern flag for the current coordinate system filters out the changes to derived items that concern the pipeline.

The changes can either be caused by the application changing the view model attributes or a pipeline changing the current coordinate system. Any changes that pass the filter cause changedComposite() to return true, meaning that the pipeline needs to check the individual items for changes.

4. Detecting Changes to Individual Derived Items

The functions that tell the pipeline if individual derived items have changed are defined by macros.

```
//
// changedComposite determines whether any items of concern have changed.
// Upon entry to LI1, a pipeline must call this function before calling
// any other member functions.
//
inline Xgl_boolean XglViewGrp2dItf::changedComposite
                                (const XglViewconcern2d* view_concern)
{
    TRACE(*XglViewGrp2dItf::changedComposite*);
    register Xgl_usgn32 flag;
    if (viewCache2d-> curCoordSys != prevCoordSys) {
        flag = viewCache2d-> coordSysChangeFlag
                            [prevCoordSys][viewCache2d-> curCoordSys];
        nackFlagA |= flag;
        prevCoordSys = viewCache2d- > curCoordSys;
    }
    flag = view_concern-> concernFlag[viewCache2d- > curCoordSys];
    if (flag & (changeFlagA | nackFlagA)) {
        return TRUE;
    }
    else {
        return FALSE;
    }
}
```

```
// ITF2D_CHG_DD defines functions for acquiring change status of derived data.
// FUNC is the name of the function that determines when a change has occurred.
// CHG_FLAG is the name of the flag that records changes caused by the
// application setting attributes.
// NACK_FLAG is the name of the flag that records changes caused by a
// switch in coordinate systems.
// DD_IDX is the name of the derived data index of the individual item.
// DD_PTR is the n,me of the pointer to the derived data evaluation function
// of the individual item.
//
#define ITF2D_CHG_DD(FUNC, CHG_FLAG, NACK_FLAG, DD_IDX, DD_PTR)
inline Xgl_boolean XglViewGrp2dItf::FUNC()
{
    TRACE(*XglViewGrp2dItf::Func*);

Xgl_usgn32 flag_mask;
    flag_mask = viewCache2d->
                        config[viewCache2d0> curCoordSys].flagTable[DD_IDX];
                NACK_FLAG &= _~flag_mask;
```

```
        if ((CHG_FLAG & flag_mask) ||
            (DD_PTR !=
                        viewCache2d-> config(viewCache2d-> curCoordSys].DD_PTR)) {
            return TRUE;
        }
        else {
            return FAISE;
        }
}
```

For example, the following macro invocation:

```
ITF2D_CHG_DD(changedMCToCc, changeFlagA, nackFlagA,
XGLI_VIEW_IDX_A_MC_TO_CC, ptrMCToCc)
``` expands to the following function:

```
inline Xgl_boolean XglViewGrp2dItf::changedMcToCc()
{
    TRACE(*XglViewGrp2dItf::Func*);
    Xgl_usgn32 flag_mask;
    flag_mask = viewCache2d-> config[viewCache2d->
curCoordSys].flagTable[XGLI_VIEW_IDX_A_MC_TO_CC];
    nackFlagA &= ~flag_mask;
    if ((changeFlagA & flag_mask) ||
        (ptrMcToCc != viewCache2d-> config[viewCache2d->
curCoordSys].ptrMcToCc)){
        return TRUE;
    }
    else {
``` specific coordinate system. The mapping stored in the View Cache's View Group Configuration for the current coordinate system gives the bit of the Transform to be retrieved. This bit is used to clear the nack flag, which indicates only a possibility of a change.

The View Group Interface maintains a set of pointers to evaluation functions in the View Cache, just like a View Group Configuration: they are both derived classes of the View Group class, which defines these function pointers. If the pointer of the View Group Interface differs from the corresponding pointer of the View Group Configuration for the current coordinate system, then the pipeline needs to get the item. The pipeline also needs to get the item if time application changed a view model attribute that invalidated time derived item.

5. Getting a Derived Item

The functions for getting derived items are defined by macros.

```
// ITF2D_GET_DD defines functions for getting derived data.
// FUNC is the name of the function that gets derived data item.
// FORMAL_ARGS is the list of formal arguments of FUNC.
// RET_TYPE is the return type of FUNC.
// CHG_FLAG is the name of the flag that records changes caused by the
// application setting attributes.
// NACK_FLAG is the name of the flag that records changes caused by a
// switch in coordinate systems.
// DD_IDX is the name of the derived data index of the individual item.
// DD_PTR is the name of the pointer to the derived data evaluation function
// of the individual item.
// ACTUAL_ARGS is the list of actual arguments of the evaluation function
// pointed to by DD_PTR.
//
#define ITF2D_GET_DD(FUNC, FORMAL_ARGS, RET_TYPE, CHG_FLAG, NACK_FLAG,
DD_IDX, DD_PTR, ACTUAL_ARGS)
inline RET_TYPE XglViewGrp2dItf::FUNC(FORMAL_ARGS)
{
    TRACE(*XglViewGrp2dItf::Func*);

Xgl_usgn32 flag_mask;
    flag_mask = viewCache2d->
        config[viewCache2d- > curCoordSys].flagTable[DD_IDX];
    CHG_FLAG &= ~flag_mask;
    NACK_FLAG & = ~flag_mask;
}
    DD_PTR = viewCache2d-> config[viewCache2d-> curCoordSys].DD_PTR;
    return (RET_TYPE) ((viewCache2d-> *DD_PTR) (ACTUAL_ARGS))
}
```

```
        return FALSE;
    }
}
```

In this example, time pipeline calls this function to check for changes to the MC-to-CC Transform. The appropriate Transform depends on the current coordinate system, but the pipeline doesn't need to know the For example, the following macro invocation:

```
ITF2D_GET_DD(getMCToCc, , XglTransform*,
changeFlagA, nackFlagA,
XGLI_VIEW_IDX_A_MC_TO_CC,ptrMcToCc,)
``` expands to the following function:

```
inline XglTransform* XglViewGrp2dItf::getMcToCc ( )
{
    TRACE("XglViewGrp2dItf::Func");
```

```
    Xgl_usgn32 flag_mask;
    flag_mask = viewCache2d->
            config[viewCache2d->
            curCoordSys].flagTable[XGLI_VIEW_IDX_A_MC_TO_CC];
    changeFlagA &= ~flag_mask;
    nackFlagA &= ~flag_mask;
    ptrMcToCc = viewCache2d-> config[viewCache2d-> curCoordSys].ptrMcToCc;
    return (XglTransform*)((viewCache2d-> *ptrMcToCc) ( ));
}
```

This function clears both the change and nack flags for the item retrieved by using the flag from the View Group Configuration for the current coordinate system. It updates the function pointer in the View Group Interface to the one for the retrieved value. Finally, it calls the evaluation/function in the View Cache by dereferencing the function pointer.

Summary of Functioning in an Implemented Embodiment

FIG. 6 illustrates process steps taken during a change of attributes by an application program within a given context. This occurs at step 602. Then, upon detection of this occurrence, the interface performs the requested changes to the current view model, however, no calculations are performed. This update results in derived items in the directed graph being invalidated by the interface manager at step 604. Then, the viewCache object records this action as a bit field with each bit field in the data structure representing a derived item at step 605. The process is thus complete at step 606.

A process which is performed upon the device pipeline calling a graphics primitive is illustrated with reference to FIGS. 7a and 7b. The application first calls a graphics primitive, for example, at step 702. Then, the interface manager transfers the view cache's bit field of invalidated items to the device pipeline's view group interface to be combined with the bit field of changed items at step 703. In implemented embodiments, geometry is passed to the device pipeline at step 704. The device pipeline then asks view group interface if it's items of concern have changed, at stop 705. The view group interface then checks it's bit field of changed items and returns true or false, at step 706. If true, as determined at step 707, the device pipeline asks the view group interface if individual items have changed at step 708. For any changed item, the device pipeline retrieves the item from the view group interface at step 709. Then, the process continues at step 710 of FIG. 7b.

At step 710, the view group interface retrieves the item(s) from the view cache. The view cache checks the bit field to determine whether the item has been invalidated. If the item is valid, then the precalculated item(s) is/are returned at step 713, and the process continues at step 715. Otherwise, the acyclic directed graph of dependencies of derived items and context attributes, as set forth in FIGS. 5a and 5b, above, is descended at step 714. At each node in the graph, the object is checked for validity. The process stops descending the graph when a valid item is found. Once a valid item is found, calculated results are moved back up the dependency graph, and each calculation causes the corresponding bit in the validity bit field to be cleared. Once complete, the requested item(s) are valid, and the device pipeline loads valid derived item in device at step 715. Then, at step 716, the device pipeline sends geometry, including the valid item(s) to the device. The advantages of this technique are that the shortcomings of prior art systems are overcome, including, no extraneous calculations of data and no extraneous loading of already valid data.

Thus, using the various data structures and operations discussed above, derived items may be calculated and maintained in a typical computer graphics system in a more efficient manner than the prior art. Also, geometry may be entered from other coordinate systems than those required by certain primitives (e.g. in Model Coordinates), and also provides a fast test to determine if derived items have changed. Although there have been some very specific embodiments described in the preceding description, these should be viewed as illustrative only, and the present invention is only to be construed as limited by the appended claims which follow.

What is claimed is:

1. In a computer system which implements a view model including a plurality of coordinate systems, a computer-implemented method for updating an item within a first coordinate system of said plurality of coordinate systems responsive to a change in another coordinate system of said plurality of coordinate systems, comprising the following steps:

a. storing in said computer system an acyclic graph, said acyclic graph representing dependencies between various items in each of said plurality of coordinate systems;

b. upon creation of said item in said first coordinate system of said plurality of coordinate systems, setting a flag corresponding to said item to indicate whether every item of a plurality of items in others of said plurality of coordinate systems is valid in its respective coordinate system; wherein said plurality of items are items upon which said item depends;

c. setting said flag corresponding to said item to indicate that at least one item of said plurality of items is not valid in its respective coordinate system if said change causes any item of said plurality of items to become invalid in its respective coordinate system; and d. when an application program references said item, d1. determining whether said flag corresponding to said item indicates that at least one item of said plurality of items is not valid in its respective coordinate system;

d2. if said flag corresponding to said item indicates that at least one item of said plurality of items is not valid in its respective coordinate system, then i. descending said acyclic graph to determine a valid item of said plurality of items, ii. when said valid item is determined, ascending said acyclic graph to determine each item of said plurality of items which depends on said valid item, iii. calculating each item of said plurality of items which depends on said valid item, iv. calculating said item, v. setting said flag corresponding to said item to indicate that each item of said plurality of items is valid in its respective coordinate system, and vi. presenting said one item to said application program.

2. The method of claim 1 wherein the change causes a given item of said plurality of items to become invalid in its respective coordinate system, the method further comprising the step of setting a flag corresponding to each item that depends on said given item to indicate that at least one item from which said each item depends is invalid in its respective coordinate system.

3. The method of claim 1 wherein the step of calculating each item of said plurality of items which depends on said valid item includes calculating said each item after calculating any invalid items upon which said each item depends and before calculating any invalid items which depend on said each item.

4. The method of claim 1 wherein said item is a transform for mapping geometry between two coordinate systems of said plurality of coordinate systems, the step of calculating said item including the step of calculating said transform.

5. The method of claim 1 wherein said item is an object corresponding to a context attribute, the step of calculating said item including the step of calculating said object.

6. The method of claim 1 wherein said change is a change to an attribute associated with said other coordinate system, the step of setting said flag to indicate that at least one item of said plurality of items is not valid in its respective coordinate system being performed if the item depends on said attribute.

7. The method of claim 1 wherein said change is a change to an object in said other coordinate system, the step of setting said flag to indicate that at least one item of said plurality of items is not valid in its respective coordinate system being performed if the item depends on said object in said other coordinate system.

8. The method of claim 1 wherein said acyclic graph is a linked list, the step of storing said acyclic graph including storing said linked list.

9. The method of claim 1 wherein said acyclic graph is a series of direct function calls, the step of storing said acyclic graph including storing code which implements said series of direct function calls.

10. The method of claim 1 further including the step of associating said item with an object which includes said flag and a second flag, said second flag indicating whether said item is valid in said first coordinate system.

11. A computer system which implements a view model including a plurality of coordinate systems, the computer system comprising:

item creation circuitry for creating an item in a first coordinate system of said plurality of coordinate systems;

change circuitry for receiving a change in another coordinate system of said plurality of coordinate systems;

structure representation circuitry for storing an acyclic graph representing dependencies between various items in each of said plurality of coordinate systems;

flag setting circuitry, wherein said flag setting circuitry, upon creation of said item, sets a flag corresponding to said item to indicate whether each item of a plurality of items in others of said plurality of coordinate systems is valid in its respective coordinate system, wherein said plurality of items are items upon which said item depends;

said flag setting circuitry setting said flag corresponding to said item to indicate that at least one item of said plurality of items is not valid in its respective coordinate system if said change causes any item of said plurality of items to become invalid in its respective coordinate system; and reference detecting circuitry for detecting when an application program references said item; and reference handling circuitry, for handling a reference to said item;

wherein said reference detecting circuitry activates said reference handling circuitry when said reference detecting circuitry detects that said application program referenced said item, wherein said reference handling circuitry includes:

flag checking circuitry for determining whether said flag corresponding to said item indicates that at least one item of said plurality of items is not valid in its respective coordinate system; and updating circuitry, said updating circuitry updating said item when said flag checking circuitry determines that the flag corresponding to said item indicates that at least one item of said plurality of items is not valid in its respective coordinate system, wherein the updating circuitry includes:

means for descending said acyclic graph to determine a valid item of said plurality of items, means for ascending said acyclic graph to determine each item of said plurality of items which depends on said valid item, means for calculating each item of said plurality of items which depends on said valid item, means for calculating said item, means for setting said flag corresponding to said item to indicate that each item of said plurality of items is valid in its respective coordinate system, and means for presenting said item to said application program.

12. The computer system of claim 11 wherein the change causes a given item of said plurality of items to become invalid in its respective coordinate system, wherein the flag setting circuitry sets a flag corresponding to each item that depends on said given item to indicate that at least one item from which said each item depends is invalid in its respective coordinate system.

13. The computer system of claim 11 wherein the means for calculating each item calculates said each item after calculating any invalid items upon which said each item depends and before calculating any invalid items which depend on said each item.

14. The computer system of claim 11 wherein said item is a transform for mapping geometry between two coordinate systems of said plurality of coordinate systems.

15. The computer system of claim 11 wherein said item is an object corresponding to a context attribute.

16. The computer system of claim 11 wherein said change is a change to an object in said other coordinate system.

17. The computer system of claim 11 wherein said acyclic graph is a linked list.

18. The computer system of claim 11 wherein said acyclic graph is a series of direct function calls.

19. The computer system of claim 11 further including means for associating said item with an object which includes said flag and a second flag, said second flag indicating whether said item is valid in said first coordinate system.

20. In a computer system having a plurality of coordinate systems including a current coordinate system, a method for determinating whether any derived item of a plurality of derived items associated with a device pipeline is invalid, comprising the steps of:

causing said device pipeline to specify said plurality of derived items;

providing a first flag word associated with said device pipeline, said first flag word having a first plurality of bits, each bit of said first plurality of bits corresponding to a derived item of said plurality of derived items;

providing a second flag word associated with said device pipeline, said second flag word having a second plurality of bits, each bit of said second plurality of bits corresponding to a derived item of said plurality of derived items;

setting a first bit corresponding to a given derived item when an application sets a view model attribute, said first bit being a bit in said first plurality of bits;

setting a second bit corresponding to the given derived item when an unacknowledged change occurs in the current coordinate system, said second bit being a bit in said second plurality of bits; and determining whether any derived item of said plurality of derived items is invalid based on said first flag word and said second flag word.

* * * * *